3,256,253
PROCESS FOR THE PRODUCTION OF ORGANIC
TIN COMPOUNDS
Wilhelm Paul Neumann, Giessen, and Horst Niermann, Cologne-Stammheim, Germany, assignors to Studiengesellschaft Kohle m.b.H., Mulheim (Ruhr), Germany
No Drawing. Filed Mar. 18, 1963, Ser. No. 266,054
Claims priority, application Germany, Mar. 20, 1962, St 18,985
11 Claims. (Cl. 260—80)

This invention relates to a process for the production of organic tin compounds.

It is only in relatively rare cases that the addition of organo tin hydrides to unsaturated systems, e.g. according to the equation $$R_3SnH + H_2C\!=\!CH\!-\!R' \rightarrow R_3Sn\!-\!CH_2\!-\!CH_2\!-\!R' \quad (I)$$

proceeds spontaneously and at a reasonable rate. It has already been suggested to accelerate greatly this reaction and to make it possible at all by adding radical-forming substances as catalysts. However, these catalysts may occasionally accelerate the homopolymerization of the olefin charged and, moreover, they consume a stoichiometrical amount of the tin hydride charged thereby leading to undesirable side reactions. Moreover, intermittent addition in portions or continuous addition of the catalyst is necessary in case of reactions taking an extended period of time, which may result in complications.

It has now been found that metal hydrides efficiently catalyze the addition, e.g. that according to Equation I, while avoiding the difficulties mentioned above. The catalysis presumably proceeds through the following stages:

(1) The metal hydride is added in the generally known manner to the olefin to be reacted or the unsaturated compound, e.g. (al=⅓ Al):

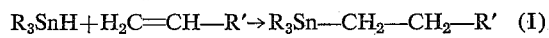

(2) Ligand exchange occurs between the metal alkyl thus formed (or organometallic compound) and the organo tin hydride to be reacted to form again the metal hydride charged as catalyst which may again enter the reaction (sn=¼ Sn)

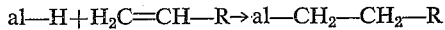
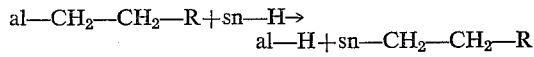

Thus, the organo tin hydride which in itself would react only very slowly or which would not react at all is eventually added smoothly to the unsaturated compound, especially the olefin.

It is an object of this invention to provide a process for the production of organic tin compounds from organo tin hydrides and unsaturated compounds, the process comprising effecting the reaction in the presence of metal hydrides or compounds which form metal hydrides when heated or which act like metal hydrides, examples being lithium-aluminum hydride, magnesium-aluminum hydride, alkyl aluminum hydrides such as HAlR$_2$ and those materials which are capable of decomposing with formation of the hydrides mentioned above, e.g. the aluminum trialkyls

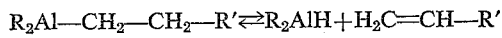

(see Ziegler, Kroll, Larbig and Steudel, "Liebigs Annalen," 629, pp. 55 et seq.). Aluminum hydride is a metal hydride which is particularly suitable for the purposes of the invention.

The amount of catalyst can be about 1–15% of the tin charged; but even smaller amounts of catalyst (e.g. 1–5 mol-percent of the tin charged) make possible a smooth and rapid conversion.

In addition to the monohydrides of tin, its organic di- and trihydrides can also be used for the catalyzed production of novel tin alkyls in the manner described:

(II) 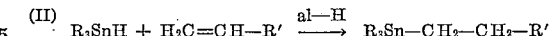

(III) 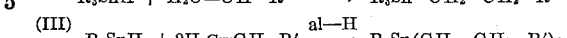

(IV) 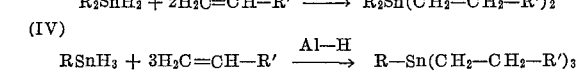

R may be an aliphatic, cycloaliphatic or aromatic radical. When combining the possibility indicated by Equations III and IV with the use of a suitable diene or triene, there is provided a new method of preparing chain-shaped or branched tin-organic high polymers having tin in the main chain, e.g. according to (V)

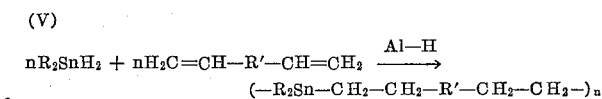

The resultant polymers are oily, tacky, elastic or solid depending upon the type of R' and the reaction conditions.

An excess of olefin (over the small amount required by the catalyst) may be used but is not necessary in most cases. It is advantageous merely in case of the above-mentioned preparation of tin-organic high polymers to use exactly stoichiometrical amounts of the reactants. However, it is possible by an excess of olefin to incorporate into the polymer a desirable number of unsaturated groups which are needed for subsequent cross-linking or other conversions.

In case of the additions described, therminal double bonds react by far more rapidly than do inner double bonds or double bonds positioned in a ring. If several olefinic groups are carried by one reactant, it is possible, therefore, to react only the terminal groups in the manner described and to utilize the remaining groups for later conversions (e.g. epoxidation and other additions). Aromatic nuclei or ether groupings in the olefin may also be introduced unchanged into the newly prepared tin alkyl.

The manner of directing or controlling the reaction is dependent upon the catalyst used. When using a substance HAlR$_2$ or AlR$_3$ the radicals R of which correspond already to the olefin being reacted (e.g. Al-tri-n-octyl in the case of n-octene-(1)), it is possible to mix the two reactants directly with the catalyst and to accelerate the reaction by heating to temperatures up to about 180° C. If R does no correspond to the olefin, it is possible first to carry out with the latter and the catalyst a so-called "displacement" reaction in known manner. In this reaction, the originally combined radicals are split off as olefin (which is preferably readily volatile) and replaced with the olefin to be reacted in the main reaction. If, for example, LiAlH$_4$ is used as the catalyst, it is advantageous in many cases first to heat with the olefin to 120–125° before adding the organo tin hydride.

It has been found to be advantageous to allow the organo tin hydride or its solution to drop into the reaction mixture at the rate as it is consumed. It is also favorable to effect a displacement reaction on the aluminum-organic catalyst as it is described in Example 1 given hereafter. This avoids the introduction of alkyl radicals other than those corresponding to the olefin.

Inert solvents may be used but can be dispensed with in most cases. Examples of useful solvents include toluene, octane, cyclohexane and hydrocarbon mixtures.

Processing may be effected by fractional distillation, if necessary after destruction of the catalyst by hydrolysis or oxidation. It is also possible to dispense with the distillation and, if desired, to shake out with water, aqueous acids or alkali solutions those components of the catalyst which are inorganic after hydrolysis. In case of volatile reaction products, it is advantageous to distill the same off from the unchanged catalyst which is then immediately available for a new batch.

The following illustrative, non-limiting, examples are presented so that a fuller understanding of the invention is obtained.

Example 1

32.48 gms. (0.3 mol) of 1-vinyl cyclohexene-(3) and 1.98 gms. (0.01 mol) of triisobutyl aluminum are heated to 70–80° C. while stirring and excluding the air and kept boiling at a moderate degree with reflux by using reduced pressure. After the isobutene has escaped, 17.88 gms. (0.1 mol) of diethyl tin dihydride are added and the mixture is stirred for 3.5 hours at 65–70° C. until the conversion is completed. The clear mixture is allowed to cool, admixed with 0.6 ml. of water and filtered to remove the $Al(OH)_3$ which has been formed. In the subsequent fractional distillation in vacuo, excess olefin is first distilled at 45–77° C. (12 mm. Hg) and is followed by the product desired, $(C_2H_5)_2Sn(CH_2-CH_2-C_6H_9)_2$, being in the form of a colorless oil. B.P. 100–101° at 0.001 mm. Hg. Sn calculated, 30.1%; found 30.0%, 29.7%. Yield, 34.8 gms. (88% of theory.) A small amount of a turbid residue is left in the still.

Example 2

2.4 gms. (0.22 mol) of styrene are stirred at 30–40° C. in a water jet vacuum with 0.7 gm. (0.005 mol) of diisobutyl aluminum hydride. After addition of 17.9 gms. (0.1 mol) of diethyl tin dihydride, the mixture is stirred under atmospheric pressure at 70° C. and finally at 125° C. until Sn—H— absorption can no longer be detected in the IR spectrum of a hydrolized sample. After hydrolysis of the total mixture and distillation, 36.0 gms.=93% of the theory of the product desired

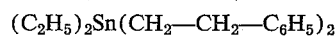

$(C_2H_5)_2Sn(CH_2-CH_2-C_6H_5)_2$ are obtained as a colorless oil. B.P. 142–144° C. at 0.001 mm. Hg. Sn calculated, 30.7%; Sn found, 30.6%.

Example 3

The procedure is the same as that described above except that 70.2 g. (0.2 mol) of triphenyl tin hydride are used. Distillation is omitted. The yield of

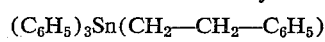

$(C_6H_5)_3Sn(CH_2-CH_2-C_6H_5)$ is 89.2 gms.=98% of theory, the product having been obtained after having driven off volatile constituents under vacuum. Sn calculated, 26.1%; Sn found, 25.7%.

Example 4

22.4 gms. (0.2 mol) of n-octene-(1) are refluxed for 1 hour with 0.2 gm. (0.005 mol) of $LiAlH_4$. After addition of 20.7 gms. (0.1 mol) of triethyl tin hydride, the mixture is stirred for 5.5 hours at 120–125° C. A sample decomposed with water shows no longer Sn—H— absorption in the IR spectrum. The bulk is distilled after treatment with 0.5 ml. of water and filtration. After the excess octene has been distilled off (B.P. 25–75° C. at 12 mm. Hg), the triethyl octyl tin desired distils (B.P. 89–92°/0.5 mm. Hg). Yield, 26.5 gms.=83% of theory. Sn calculated, 37.2%; Sn found, 37.1%, 37.5%.

The catalyst may also be re-used directly (without the hydrolysis mentioned above) after having distilled off the reaction product. Equivalent amounts of $Mg(AlH_4)_2$ may also be used as the catalyst.

Example 5

11.2 g. (0.1 mol) of n-octene-(1) are stirred with 20.7 g. (0.1 mol) of triethyl tin hydride and 1.85 g. (0.005 mol) of trioctyl aluminum as the catalyst for 7.5 hours at 80° C. After cooling, 0.3 ml. $H_2O$ are added to the mixture which is then filtered and distilled. Yield, 30.6 g.=96% of theory. B.P. 90–95° at 0.7 mm. Hg. Sn calculated, 37.2%; Sn found, 37.4%.

The same result is obtained when using as the catalyst 0.3 g. of $AlH_3$ freshly prepared in a manner known per se. Admixtures of $AlH_3 \cdot OR_3$ and LiCl which may be present from the preparation are not detrimental.

Example 6

9.0 g. (0.065 mol) of 3,7-dimethyl octadi-(1,6)-ene are reacted with 0.7 g. (0.005 mol) of diisobutyl aluminum hydride and then with 22.95 g. (0.05 mol) of tri-n-octyl tin hydride, the temperature being initially 70° C., finally 120° C. and for a short time as high as 130° C., until Sn—H— can no longer be detected. After hydrolysis and removal of the volatile components, the product desired $(C_8H_{17})_3SnC_{10}H_{19}$, is obtained as a colorless oil. Yield, 28.4 g.=95% of theory. Sn calculated, 19.9%; Sn found, 19.6%.

Example 7

15.6 g. (0.12 mol of p-divinyl benzene are stirred for 1 hour in a water jet vacuum at 30–40° C. with 0.71 g. (0.005 mol) of diisobutyl aluminum hydride. Then 17.88 g. (0.1 mol) of diethyl tin dihydride are added and the temperature is maintained at 60–75° C. while stirring until the reaction is completed. The contents of the flask becomes increasingly viscous and finally solidifies. After dissolution in benzene, the catalyst is hydrolyzed and the organic phase is evaporated to constant weight, at last at 0.1 mm. Hg and 80° C. The product (30.0 g.=97% of theory) is a colorless, solid, elastic material. Sn calculated, 38.4%; Sn found, 37.9, 38.1%. The result is the same if the commercial mixture of the p- and m-isomers is used in place of p-divinyl benzene.

Example 8

36.6 g. (0.23 mol) of 1,2,4-trivinyl cyclohexane are treated with 1.42 g. (0.01 mol) of diisobutyl aluminum hydride in the manner described and then stirred with 70.4 g. (0.3 mol) of di-n-butyl tin dihydride using initially a temperature of 70° C. and then 90–100° C. until Sn—H— and olefin absorptions have disappeared in the IR spectrum. After dilution with benzene, the mixture is hydrolyzed with 2 N HCl, separated, and the organic phase is evaporated to constant weight. There are obtained 101.2 g.=99% of the theory of a colorless, clear and soft resin. Sn calculated, 34.7%; Sn found, 34.3%. If a slight excess in place of the above-mentioned amount of olefin is used, a clear, thick oil having a residual content of unsaturated groups is obtained.

When repeating the example except that a radical-forming substance is used as the catalyst, e.g. several portions of azo-isobutyronitrile in a total amount of 1.4 g., the product after 120 hours still contains 10% of the original Sn—H— linkages which react only very slowly even when continuing the heating and adding further amounts of catalyst. In doing so, undesirable side reactions, e.g. evolution of $H_2$, occur. When operating entirely without a catalyst, a reaction does not take place.

Example 9

24.3 g. (0.22 mol) of octadiene-(1,7) are first treated with 0.71 g. (0.005 mol) of diisobutyl aluminum hydride and then for 6 hours at 75–80° C. with 47.0 g. (0.2 mol) of di-n-butyl-tin dihydride until Sn—H— and olefin bands have disappeared in the IR spectrum. After dilution with benzene, the catalyst is hydrolyzed and the mixture evaporated to form 68.0 g.=98.5% of theory of a colorless, clear, very viscous oil. Sn calculated, 34.4%; Sn found, 34.1%. The catalyst may also be deactivated by introduction of air. Its removal may also be dispensed with if its presence does not result in troubles.

Example 10

31.4 g. of octadiene-(1,7) are stirred for 4 hours at 90° C. with 1 g. of freshly prepared $AlH_3$ and 58.8 g. of di-n-butyl tin dihydride. The resultant gelatin then contains no longer Sn—H and olefin. Removal of the aluminum compounds with dilute aqueous HCl and processing give a clear, colorless, viscous oil in a 92% yield.

When repeating this example except that a free radical catalyst (e.g. 0.8 g. of azo-isobutyronitrile, added in several portions during the course of the experiment) is used, the reaction product even after 170 hours still shows marked amounts of unconverted Sn—H— and C=C groups. When repeating the example without the use of a catalyst, a noticeable conversion does not occur even within 100 hours. Therefore, this experiment was discontinued after 100 hours.

Example 11

A solution of 50 g. of diisobutyl tin dihydride in 200 ml. of cyclohexane was allowed to drop into a stirred mixture of 27.5 g. of octadiene-(1,7) and 2.15 g. of diethyl aluminum hydride heated at 85° C., the addition being effected within 50 hours. After processing in the manner described, a viscous, clear oil is obtained in a 100% yield.

Example 12

A mixture of 5.4 g. of cis,cis-cyclooctadiene-(1,5) and 0.7 g. of diisobutyl aluminum hydride is heated for 1 hour at 120° C. and thereafter the isobutene dissolved is removed at 20° C. and 20 mm. Hg. Then 11.7 g. of di-n-butyl tin dihydride dissolved in 50 ml. of cyclohexane are allowed to drop into the mixture at 95° C. within four days. After having subjected the catalyst to hydrolysis and distilled off the volatile constituents at 130° C. and $10^{-4}$ mm. Hg, a slightly turbid, viscous oil is left. Yield, 82%. Sn calculated, 34.6%; Sn found, 34.3%.

Example 13

A mixture of 20 g. of di-n-butyl tin dihydride and 1.8 g. of isobutyl tin trihydride in 100 ml. of xylene is allowed to drop within 3 days into a mixture (90–95° C.) of 11.0 g. of octadiene-(1,7) and 0.7 g. of diisobutyl aluminum hydride. There is formed a colorless gelatin which is clear as glass and from which the aluminum can be removed by elutriation with Seignette salt. After having removed the cyclohexane from the organic phase by suction filtration, a tacky, colorless and transparent substance which is sparingly soluble in toluene is obtained in a quantitative yield.

Example 14

In the manner described in Example 13, a yellow gelatin is obtained within 20 hours at 100° C. from 55 g. of octadiene-(1,7), 2 g. of diisobutyl aluminum hydride and 22.35 g. of isobutyl tin trihydride in 300 ml. of xylene. After hydrolysis of the catalyst and removal of the xylene in vacuo, there are left 77.0 g. of a colorless rubber which still contains some vinyl groups and 5% of constituents which are soluble in boiling xylene.

Example 15

179 g. of isobutyl tin trihydride dissolved in 224 g. of n-octene-(1) are allowed to drop with stirring at 100° C. within 24 hours into 224 g. of n-octene-(1) and 30 g. of tri-n-octyl aluminum. By-products are converted into insoluble compounds within 10 minutes by hydrolysis and sucking air through the mixture. Excess octene can be distilled off from the organic phase. The residue is subjected to fractional distillation in vacuo. The product is isobutyl-tri-n-octyl tin $C_4H_9Sn(C_8H_{17})_3$. B.P., 150–154° C./0.002 mm. Hg; yield, 459 g.=89% of theory of a colorless oil; $n_D^{20}=1.4743$; Sn calculated, 23.0%; Sn found, 22.9%.

Example 16

62.0 g. of triethyl tin hydride, 6.81 g. of pentadiene-(1,4) and 0.86 g. of diethyl aluminum hydride are mixed in a wide test tube which is placed into a 250 ml. autoclave which has been flushed with argon. The autoclave is heated for 3 days at 100–110° C. The pressure first rises to 4 atmospheres gauge and decreases to 1 atmosphere gauge towards the end of the reaction. After hydrolysis and removal of excess triethyl tin hydride by distillation, the mixture is subjected to fractional distillation in vacuo resulting in 41.9 g.=87% of theory of the product desired, $(C_2H_5)_3Sn(CH_2)_5Sn(C_2H_5)_3$, which is a colorless oil.

The term "alkyl" and derivatives thereof as used herein means an aliphatic hydrocarbon group such as for example —$CH_2$—$CH_3$ or —$CO_2$—$CS_2$—.

What is claimed is:

1. A process for alkylating tin which comprises contacting organo tin hydride selected from the group consisting of mono, di and tri tin hydrides with olefin in the presence of an aluminum-containing metal hydride as catalyst, the aluminum-containing metal hydride being present in amount of at least about 1 mol percent of the organo tin hydride.

2. A process for production of tin tetra alkyl which comprises contacting alkyl tin hydrides of the formula $SnR_xH_y$ wherein R is alkyl and $x+y$ is equal to 4 and y is 1–3, with olefin in the presence of an aluminum-containing metal hydride as catalyst, the aluminum-containing metal hydride being present in amount of at least about 1 mole percent of the organo tin hydride.

3. A process according to claim 2, wherein the metal hydride is aluminum hydride.

4. A process according to claim 2, wherein said metal hydride is magnesium-aluminum hydride.

5. A process according to claim 1, wherein the catalyst which has been used in said reaction is re-used in a new reaction of the invention.

6. A process according to claim 1, wherein said catalyst is used in an amount of from 1 to 15 mole percent, based on tin charged.

7. A process according to claim 1, wherein a stoichiometrical amount of olefin is used for preparing tin-organic high polymers.

8. A process according to claim 1, wherein an excess of olefin is used and the alkylated tin product is a polymer including tin radicals and hydrocarbon radicals in the polymer chain.

9. A process according to claim 1, wherein said reaction is accelerated by heating.

10. A process according to claim 1, wherein said organo tin hydride gradually added to the alkylating material during said contacting.

11. A process according to claim 10, wherein a solution of said organo tin hydride is used.

References Cited by the Examiner

UNITED STATES PATENTS 3,098,088  7/1963  Polster _____ 260—429.7

JOSEPH L. SCHOFER, *Primary Examiner.*

LEON J. BERCOVITZ, *Examiner.*

L. WOLF, *Assistant Examiner.*